C. C. GATES.
BELT MAKING PROCESS.
APPLICATION FILED OCT. 3, 1918.
1,400,538.
Patented Dec. 20, 1921.
4 SHEETS—SHEET 1.
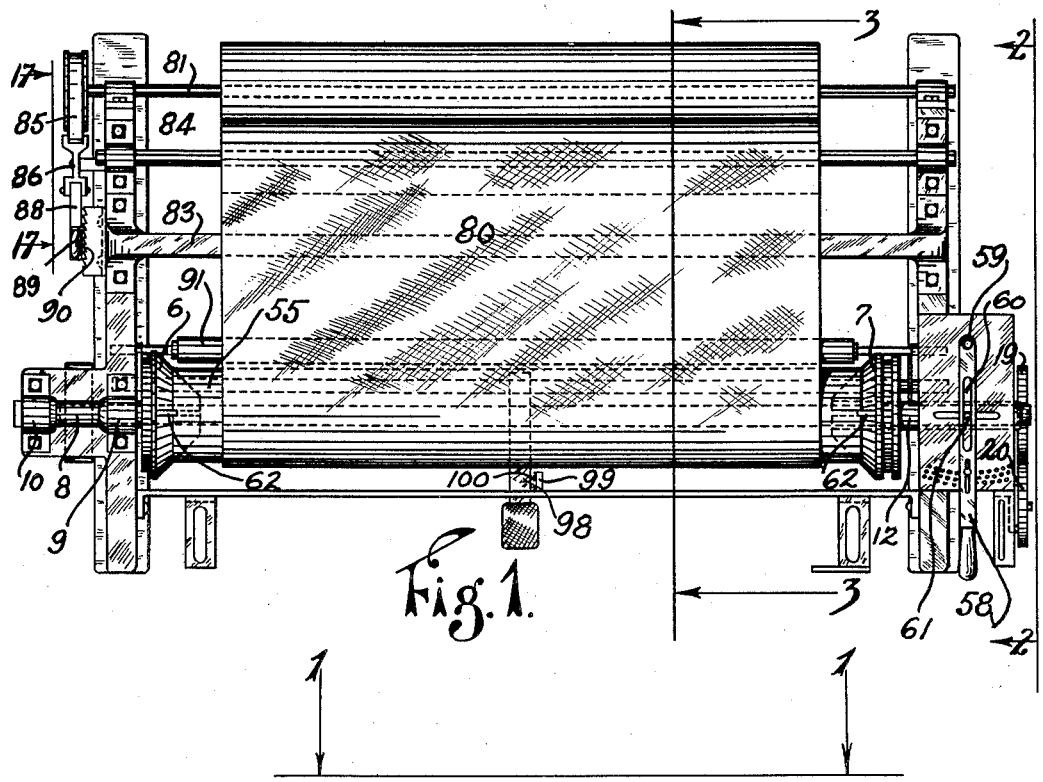
Fig. 1.
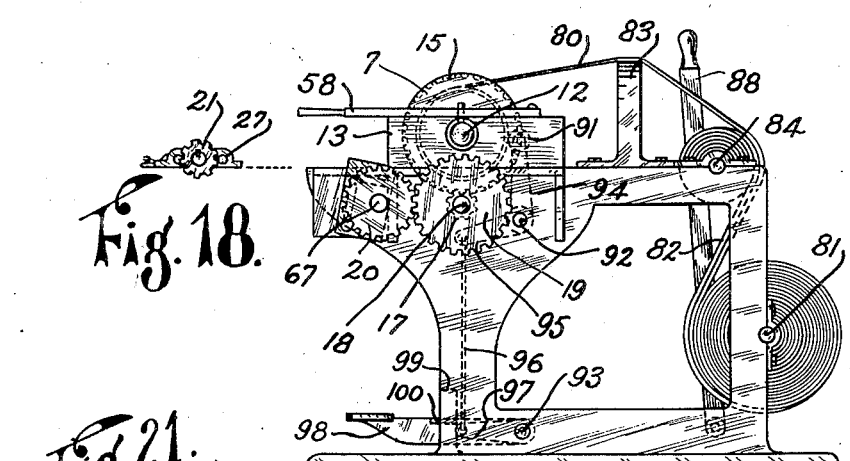
Fig. 18.
Fig. 2.
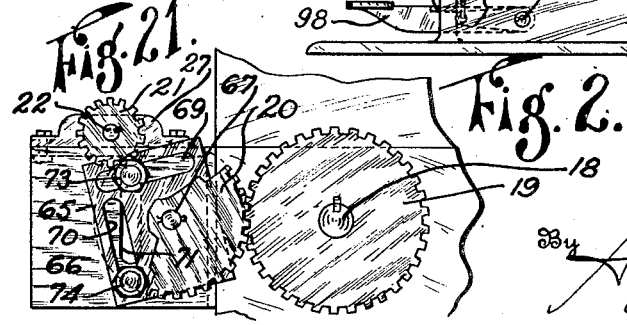
Fig. 21.
Inventor.
C. C. Gates.
By
Attorney.

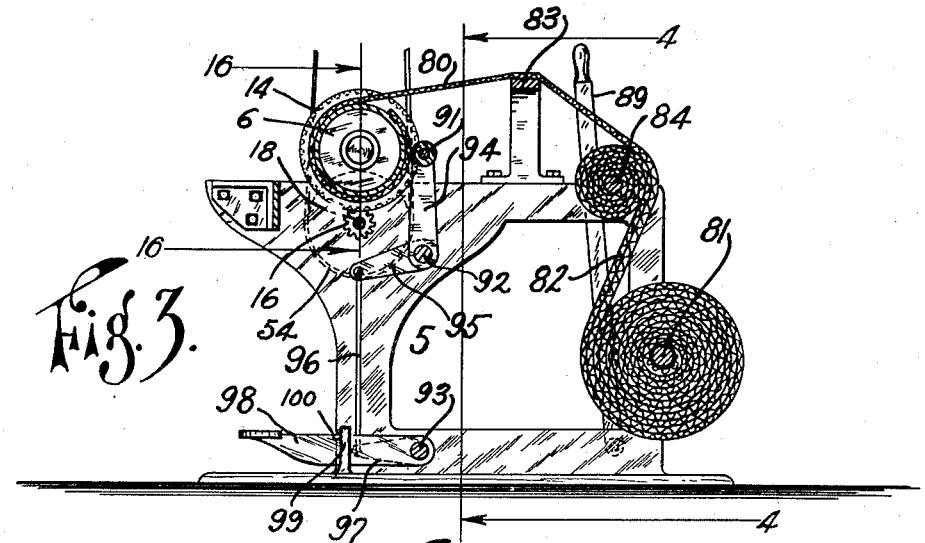
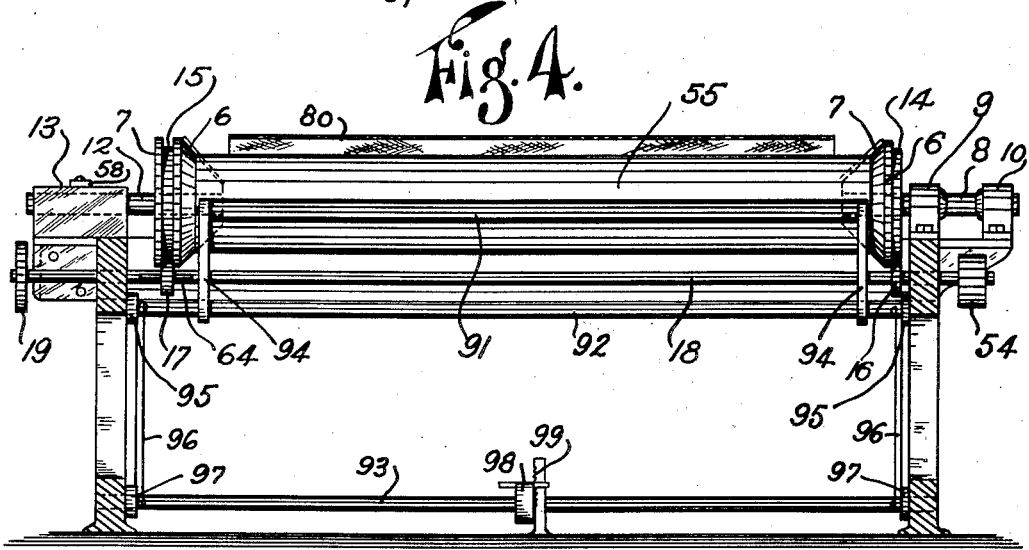
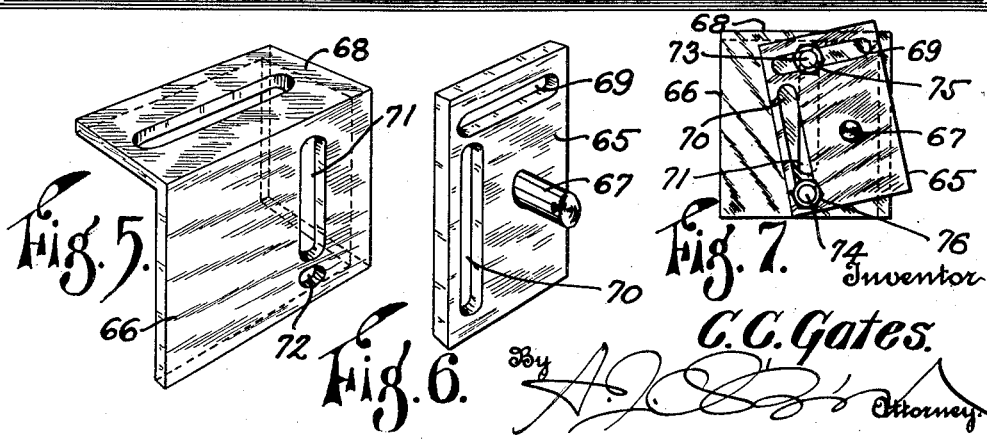

C. C. GATES.
BELT MAKING PROCESS.
APPLICATION FILED OCT. 3, 1918.
1,400,538.
Patented Dec. 20, 1921.
4 SHEETS—SHEET 3.
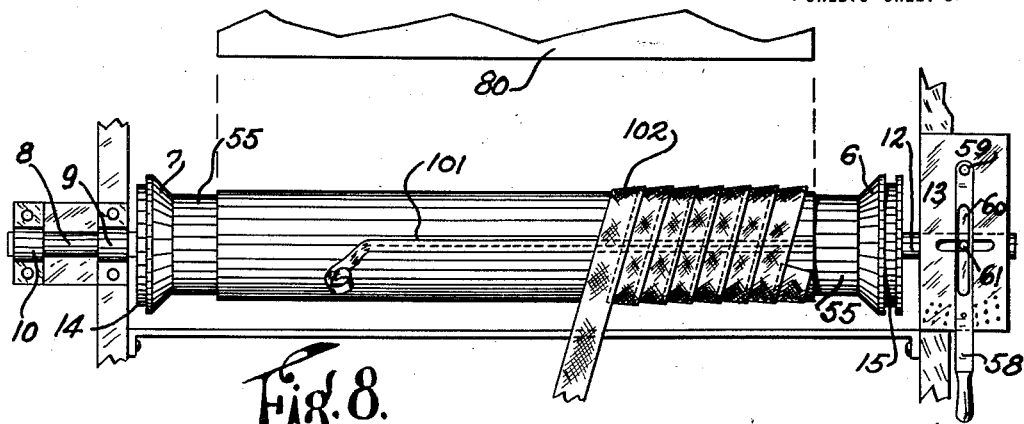
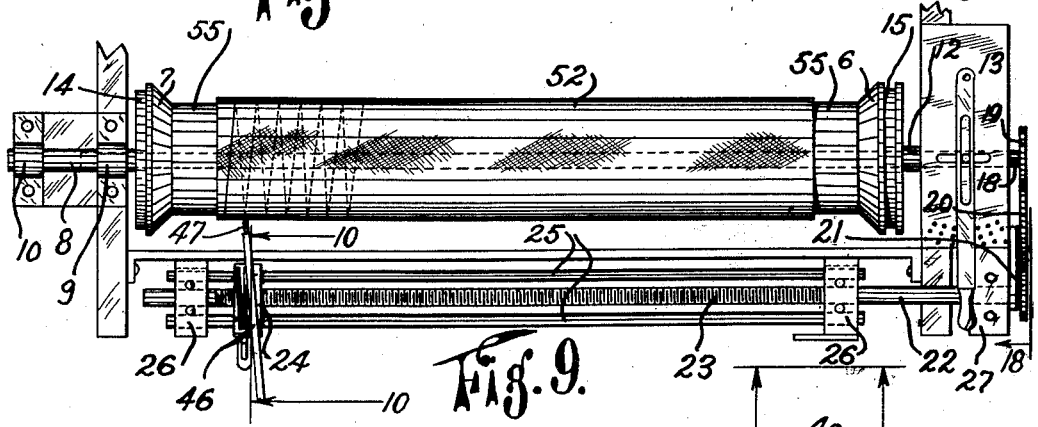
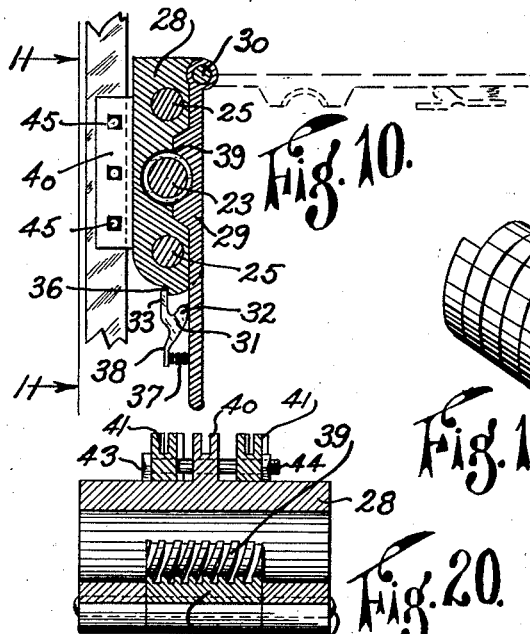
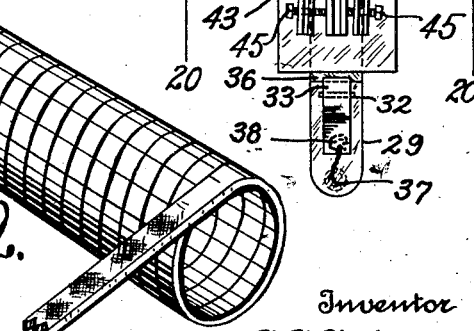
Inventor
C. C. Gates.

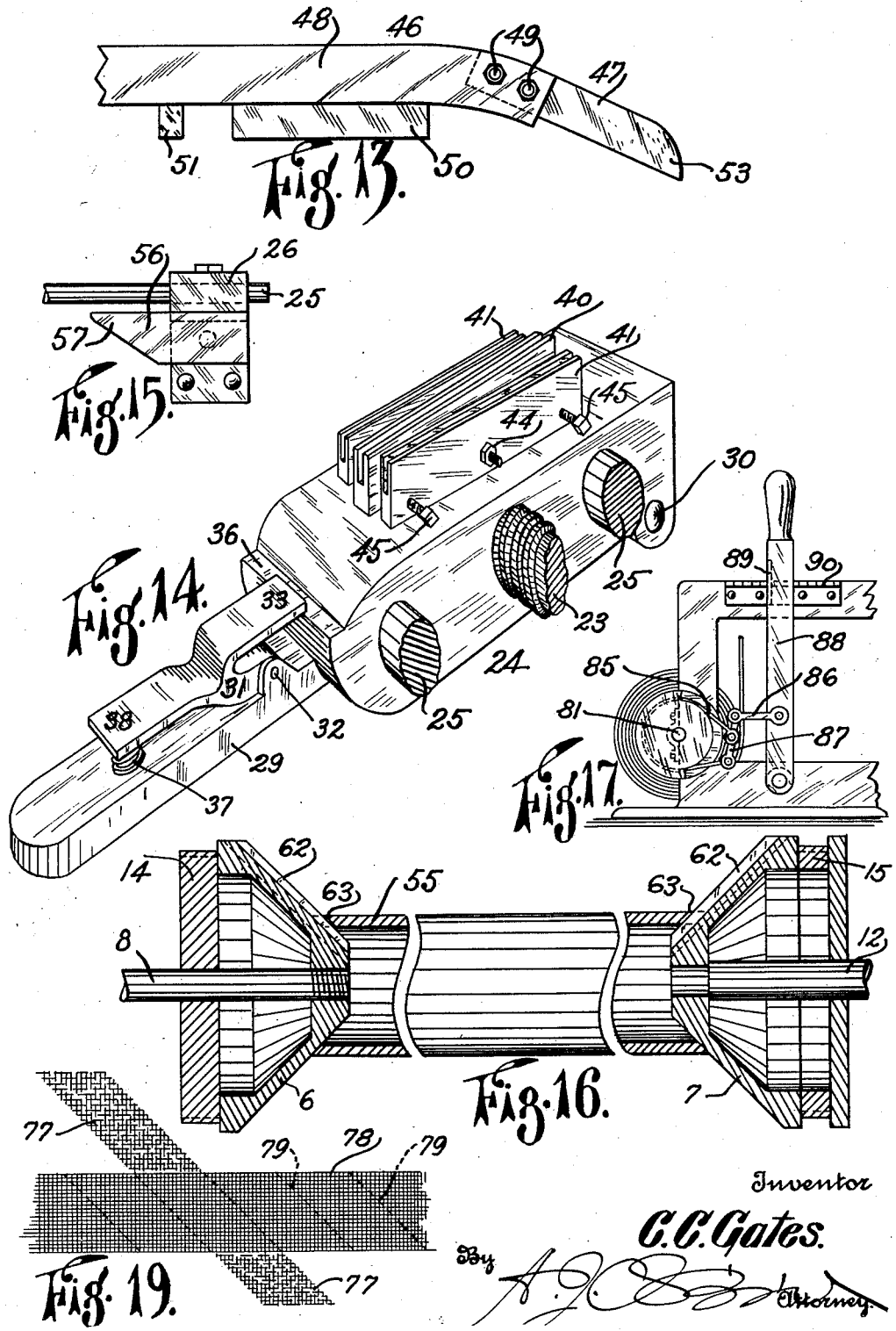

UNITED STATES PATENT OFFICE.

CHARLES C. GATES, OF DENVER, COLORADO.

BELT-MAKING PROCESS.

1,400,538.  Specification of Letters Patent.  Patented Dec. 20, 1921.

Application filed October 3, 1918. Serial No. 256,640.

*To all whom it may concern:*

Be it known that I, CHARLES C. GATES, a citizen of the United States, residing in the city and county of Denver and State of Colorado, have invented certain new and useful Improvements in Belt-Making Processes; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in a process and apparatus for making belts, my object being to provide a method and means particularly well adapted for cutting belts of any desired length from a cylindrical belt member formed by winding superposed layers of rubberized fabric upon a drum, the number of layers or convolutions being sufficient to conform to the required thickness of the belt, the drum being afterward placed in a vulcanizer, whereby the said layers are formed into a homogeneous fabric. The drum is then taken out of the vulcanizer and placed upon a structure of the lathe type, and rotated. The invention covered by this application relates more particularly to the cutting of this cylindrical belt member into a belt of the desired length and width, the cutting knife being mounted to travel in a direction parallel to the axis of the drum carrying the cylindrical belt member. By virtue of the constant travel of the knife while the belt member is rotating, the knife, while piercing the thickness of the member, is caused to form a spiral kerf, the width of the belt being determined by the speed of travel of the knife. It will be evident that the slower the knife travels for a given rotary travel of the cylindrical belt member, the narrower will be the belt which is formed by this operation. Hence it is important that a considerable range of travel of the knife be provided for.

In the drawing forming a part of this application, I have illustrated the apparatus for winding the superposed layers of rubberized fabric in order to form the cylindrical belt member. I have also illustrated the manner of producing the belt fabric so that the warp and woof threads of the fabric shall form angles with the length of the belt. The process for forming the cylindrical belt member is described and claimed in my simultaneously pending application, Serial No. 193,527, filed September 27th, 1917. Furthermore, much of the apparatus illustrated in this application is a repetition of that disclosed in my simultaneously pending application entitled "Belt making apparatus," Serial No. 193,525, filed September 27th, 1917.

Having briefly outlined my improvement, I will proceed to describe the same in detail, reference being made to the accompanying drawing, in which is illustrated an embodiment of the apparatus. In the drawing:

Figure 1 is a top plan view of apparatus for winding the belt fabric upon a drum to form a cylindrical belt member.

Fig. 2 is an end elevation of the same, or a view looking in the direction of arrows 2, Fig. 1.

Fig. 3 is a section taken on the line 3—3, Fig. 1, looking toward the left.

Fig. 4 is a section taken on the line 4—4, Fig. 3, viewed in the direction of the arrows.

Figs. 5 and 6 are perspective views, respectively, of two plates forming parts of a structure which, when assembled, is adjustable for the purpose of bringing an idler gear into coöperative relation with two other gears.

Fig. 7 illustrates the assembled relation of the two members shown in Figs. 5 and 6.

Fig. 8 is a view illustrating the manner of covering the cylindrical belt member before it is placed in the vulcanizer.

Fig. 9 is a top plan view of a lathe structure equipped with my improved belt-cutting appliance.

Fig. 10 is a section taken on the line 10—10, Fig. 9, looking toward the left, the parts being shown on a larger scale.

Fig. 11 is a top plan view of the knife-holding block, shown mounted on a feed screw, which gives the block the required travel.

Fig. 12 is a perspective view, illustrating a coil of belt cut by the use of my improved structure as it would appear after the cylindrical member is cut to form a belt.

Fig. 13 is a side view, partly broken away, illustrating the knife shown on a larger scale than in Figs. 9 and 10.

Fig. 14 is a perspective view of the knife-holding block, shown on a much larger scale than in Figs. 9 and 10.

Fig. 15 is a detail view obtained by looking in the direction of arrows 15, Fig. 9, the parts being shown on a larger scale.

Fig. 16 is a sectional view of the drum upon which the cylindrical belt member is wound, the drum being partly broken away in this view and the parts shown on a larger scale than in the other figures.

Fig. 17 is a view looking in the direction of arrows 17, Fig. 1.

Fig. 18 is a view looking in the direction of the arrow 18, Fig. 9, and illustrating the belt-cutting mechanism detached from the lathe structure.

Fig. 19 is a view illustrating the manner of forming the strip of fabric which is to form the superposed layers of the cylindrical member from which the belt is cut.

Fig. 20 is a section taken on the line 20—20 in Fig. 11, the parts being shown on a larger scale.

Fig. 21 is a fragmentary side elevation of the operating means for the belt-cutting mechanism, the parts being shown on a larger scale than in Fig. 9.

The same reference characters indicate the same parts in all the views.

Let the numeral 5 designate a suitable stationary framework upon which are mounted two truncated cone members, 6 and 7, the member 6 being fast on a short shaft, 8, which is journaled in bearings, 9 and 10, carried by the main or stationary frame 5. The member 7 is fast on a short shaft, 12, which is journaled in a box, 13, mounted on the framework, 5. The member 6 is provided with a gear, 14, and the member 7 with a gear, 15, these gears being respectively engaged by smaller gears, 16 and 17, carried by an operating shaft, 18, which is arranged directly below the axis of the members 6 and 7. One extremity of the shaft 18 is provided with a gear, 19, which meshes with an idler gear, 20, the latter in turn being adapted to mesh with a gear 21, fast on one extremity of a shaft 22, having a threaded body portion, 23, which is arranged to impart travel to a knife-holding block, 24, said block being slidable on two guide rods, 25, arranged on opposite sides of the screw shaft, the opposite extremities of the rods engaging bearings 26, in which the screw shaft 22 is journaled, this shaft also having an additional bearing, 27.

The knife-carrying block, 24, is composed of a body member, 28, and a member, 29, which is hingedly connected with the body member at one extremity, as shown at 30, its opposite extremity being normally held in coöperative relation with the body member by a trigger, 31, pivotally connected with the part 29, as shown at 32. One extremity, 33, of this trigger, is normally held in retaining engagement with a shoulder, 36, of the part 28, by means of a spiral spring, 37, which acts upon the opposite arm, 38, of the trigger, this spring being arranged between this arm and the adjacent part of the member, 29. The opening for the threaded portion, 23, of the screw shaft is formed partly in the body member, 28, and partly in the hinged member, 29. The opening in the body member, 28, which receives the threaded member of the screw shaft, is plain, or unthreaded, while the opening in the part 29 which receives this shaft is threaded, as shown at 39 (see Fig. 20). Provision is made for automatically releasing the knife-carrying block from operative traveling engagement due to the rotation of the screw shaft as hereinafter more fully explained.

The body 28 of the knife-carrying block is provided with a number of knife-holding parts, three being illustrated in the drawing and respectively designated 40, 41 and 42. The part 40 is stationary on the knife-block and is connected with the two parts 41 and 42 by means of a bolt, 43, and a nut, 44. The two parts 41 and 42 carry at their opposite extremities stud bolts, 45, which are threaded into the respective members and bear against the member 40. A small degree of rocking movement on the bolt 43 is permitted the parts 41 and 42 so that these knife-holding parts may be properly adjusted as circumstances may require.

The provision of a number of knife-holding members makes it possible to simultaneously employ a series of knives, if it should be required or thought necessary. A knife of suitable character to fit into any one of these holders is shown in Fig. 13, and designated in its entirety by the numeral 46, the blade, 47, being secured to the handle, 48, by means of suitable fastening devices, 49. This handle has a part, 50, which fits into any one of the parts or members 40, 41 or 42, the handle also having a stop, 51, which prevents the sliding of the knife toward the cylindrical member from which the belt is to be cut when the knife is in use. Assuming that the cylindrical belt member, 52 (see Fig. 9), is in position for belt cutting purposes, the knife may be inserted in any one of the said holders of the knife-carrying block, the cutting extremity, 53, of the blade being brought into engagement with the member 52 from below. Then, as power is supplied to the operating shaft, 18, by connecting a motor of suitable character, or a line shaft (not shown) with a wheel, 54, on the shaft, 18, the cylindrical member which is mounted on a drum, 55, carried by the two truncated members, 6 and 7, together with the screw shaft, 22, are simultaneously operated through the medium of the gears 19, 20 and 21. During this operation the person in charge of the machine takes hold of the handle, 48, of the knife, which handle is relatively long, and applies the necessary pressure to cause the extremity, 53, of the blade to cut through the cylindrical belt member, 52, the speed of the screw shaft, 22, being regulated as desired, in order to regulate the width of the belt to be cut, the knife forming a spiral kerf in the belt member, 52, as the operation proceeds. As soon as the knife-carrying block has traveled the necessary distance to form the cylindrical member, 52, into a belt, a projection, 56, carried by the bearing 26, and having an inclined face, 57, engages the arm 38 of the trigger, 31, and depresses the said arm sufficiently to disengage the part 33 of the trigger from the shoulder, 36, of the body, 28, of the knife-carrying block, in which event the hinged part, 29, of this block immediately drops into the inoperative position, thus disengaging the threaded portion, 39, of the block from the threaded part of the screw shaft. As soon as this occurs the travel of the block ceases. In this manner, the movement of the block automatically terminates at the proper time.

If desired, several knives may be simultaneously carried by the block, and all made to engage the same spiral kerf in the event that this should be necessary in order to positively insure the cutting entirely through of the belt member, 52, during the belt-forming operation. Or, one of the knives, namely the one which is forward with reference to the direction of travel of the knife block, may be so set as to cut a relatively wide belt, while the other knives are so set as to subdivide this relatively wide belt into narrower belts. In this way, three knives might be simultaneously operated to cut a number of belts. However, it is believed that ordinarily one knife only would be required, since, as this knife is under the control of the operator and is equipped with a proper length of handle, the operator may so regulate the pressure of the knife upon the cylindrical belt member as to just cut therethrough without dulling the part 53 of the knife blade. However, the employment of a plurality of knives is practicable and may be found highly desirable, in simultaneously cutting a plurality of belts.

In order to mount the drum, 55, which is hollow and open-ended, upon the truncated members 6 and 7, one of these members, as the member 7, is adjustable in the direction of its axis, through the medium of a lever, 58, which is fulcrumed on the frame, as shown at 59, and slotted, as shown at 60, to receive a pin, 61, which is connected with the shaft 12, the latter being movable endwise in its bearing, the truncated member, 7, being connected with the shaft 12 to move axially therewith and to rotate thereon, while the shaft remains stationary. Each of the members 6 and 7 has a spline, or tongue, 62, forming a sort of locking key which fits into a counterpart slot, 63, formed in the adjacent end of the drum, 55, whereby the latter is locked against independent rotation and caused to rotate with the truncated members.

The gear, 17, which engages the gear 15 of the member 7, is splined on the shaft 18, as shown at 64, so that it is free to move axially on its shaft with the member 7 during the adjustment of the latter necessary in mounting and demounting the drum, 55.

As the change of speed of the screw shaft, 22, in its relation to the drum, 55, and the cylindrical belt member, 52, carried thereby, is very important, I make provision for a great variety of speeds by so mounting the idler gear, 20, that any size of idler gear within reasonable limits may be employed and still cause the said gear to mesh with the two gears 19 and 21. Furthermore, the size of the other gears may be varied by reason of the relatively large range of adjustment provided for with reference to the idler 20. This adjusting mechanism consists of two plates, designated 65 and 66, respectively, the plate 65 carrying a short shaft or journal, 67, upon which the idler gear, 20, is mounted. The plate 66 is stationary with the body of the framework, as shown at the right of Fig. 1, this plate being provided with a horizontal flange, 68, forming a support for the bearing, 27, of the shaft, 22 (see Fig. 9). The plate 65 is provided with a slot, 69, in its upper portion and which extends at right angles to a slot, 70, formed in the same plate. The slot 69 may, for convenience, be termed a horizontal slot, and the slot 70, a vertical slot, since these terms will be correct if we may term the position of the plate when these slots are so arranged the "normal" position. The plate 66 is also provided with a vertical slot, 71, and a perforation, 72, directly below this slot. When the parts are in the assembled relation, the plate 65 is applied to the portion of the plate 66 containing the slot 71, and the perforation 22, the two plates being connected by bolts 73, and 74, the bolt 73 passing through the slot 69 of the plate 65, and the slot 71 of the plate 66, while the bolt 74 passes through the slot 70 of the plate 65, and the perforation 72 of the plate 66. Now, as the idler gear, 20, is mounted to rotate on the journal, 67, which is fast on the plate 65, by loosing the nuts, 75 and 76, which are respectively applied to the bolts, 73 and 74, it will be understood that the plate 65 and the idler gear may be shifted if necessary into a great variety of positions for the purpose of causing the idler gear to mesh with the two gears 19 and 21.

The manner of forming the cylindrical member, 52, from which the belt is cut, will now be described. The fabric is formed of pieces, 77 (see Fig. 19), which are obtained by cutting a woven piece of fabric, 78, on the dotted lines, 79, or at an angle of approximately 45 degrees to the warp and woof threads of the fabric; hence, when these pieces, 77, are connected to form a long sheet, the warp and woof threads will form angles to the length of the piece, which is an important feature in the construction of the belt cut by my improved mechanism. A strip or sheet of fabric composed of the part 77, I will designate by the numeral 80, and the same is wound upon a shaft, 81 (see Fig. 3), in connection with a sheet of fabric, 82, which spaces the convolutions of the fabric 80 to prevent adhering when on the shaft 81.

One extremity of the sheet 80 is first passed over an upright support, 83, and connected with the drum, 55, while the interposed layer of fabric, 82, is connected with a shaft, 84, between the shaft 81 and the drum 55. It is assumed that the sheet of fabric 80 has first been treated to produce the necessary rubberized condition in order that the later step of vulcanizing may be effective. After connecting the sheet 80 with the drum 55, power is applied through the medium of the shaft 18 whereby rotary motion is imparted to the truncated members 6 and 7 by virtue of their gearing connection with the shaft 18, as heretofore explained. During this operation it must be understood that the gears 19, 20 and 21 are not utilized. In other words, while the gears 19 and 20 may be in place upon the structure, the belt-cutting mechanism (best illustrated in Fig. 9) is not in use. In actual practice there will be two machines—one containing the mechanism illustrated in Figs. 1 and 3, and the other that illustrated in Fig. 9. But for convenience it may be assumed that the machine is convertible and that the cutting mechanism consisting of the screw shaft, 22, and the knife-carrying block, 24, and their connections, is detached during the operation of winding the rubberized fabric on the drum, 55.

In order that the convolutions of the fabric 80 may be caused to closely engage each other, and in order that some of the elasticity may be taken out of the fabric 80 as it is unwound from the shaft 81, provision is made for resisting the free rotary movement of this shaft by the employment of a brake-band, 85 (see Fig. 17), which is connected through the medium of toggle members, 86 and 87, with a lever, 88, having a part, 89, coöperating with a ratchet, 90. Furthermore, as the rubberized fabric, 80, is wound on the drum, 55, a roller, 91, is caused to press upon the convolutions of the drum through the medium of two rock shafts, 92 and 93. On the rock shaft 92 are two lever arms, 94 and 95, the arm 94 carrying the roller 91, and the arm 95 being connected by a rod, 96, with a crank arm, 97, fast on the rock shaft, 93. A foot lever, 98, is also fast on the shaft 93, and is conveniently arranged to operate the shaft 93 in order to cause the roller, 91, to exert the required pressure on the convolutions of the fabric, 80, as they are wound on the drum, 55. A suitable ratchet, 99, is arranged to coöperate with a part, 100, carried by the foot lever, 98, so that the mechanism may be readily locked and released.

As soon as the proper number of layers or convolutions of the rubberized fabric, 80, are wound upon the drum, 55, the severed edge of this drum will be sealed by a sealing strip, 101 (see Fig. 8), after which the cylindrical belt member formed from the rubberized sheet, 80, will be covered by winding thereon a suitable fabric, 102, after which the drum, 55, with its cylindrical belt member, 52, will be removed from the truncated parts, 6 and 7, and will be placed in the vulcanizer during the required time for effective vulcanization. The drum and its member will then be removed from the vulcanizer and the covering, 102, unwound therefrom, after which the drum with the member 52 may be mounted on the truncated members 6 and 7, either of the same machine as was employed for winding, or upon another set of truncated members mounted upon a frame carrying the cutting mechanism disclosed in Fig. 9. If the same frame used in winding the rubberized fabric upon the drum 55 is employed, the cutting mechanism will be applied thereto, since this mechanism may be readily attached and detached if desired. Though, when the apparatus is employed continuously it will, of course, be desirable to have two machines, one for winding the rubberized fabric upon the drum, 55, and another upon which the drum, 55, and the member, 52, will be mounted after the vulcanizing act and preparatory to the cutting of the member 52 into a belt, as heretofore explained.

The foot lever, 98, is so mounted on the rock shaft, 93, that it will have sufficient lateral movement to cause its part 100 to engage and disengage the ratchet member, 99, for the purpose of locking and releasing the said lever according as it is desired, to cause the roller, 91, to engage the convolutions of the belt member, or disengage the belt member after the formation thereof.

It should be explained that in forming the spiral cut in the cylindrical belt member, where the latter is composed of the woven fabric described, the pitch of the spiral must be different in degree from the angles formed by the warp and woof threads of the fabric with reference to the length of the woven sheet of which the cylindrical member is composed. It is preferred that the warp and woof threads of the fabric should form considerable angles with the length of the sheet of rubberized material employed to form the cylindrical belt member, as indicated by the thread lines in Figs. 9, 12 and 19, so that when a spiral cut of reasonable pitch is formed in making the belt, the warp and woof threads will still form such angles with the length of the belt as to give the required degree of elasticity and also prevent the fraying out of the belt, the latter difficulty arising when one set of threads conforms in direction to the length of the belt. Where the angles of the warp and woof threads with the length of the sheet are considerable, as explained, it is assumed that the pitch of the spiral will always be sufficiently less in degree to preserve the aforesaid advantages of the diagonal arrangement of the said threads with reference to the length of the belt.

Having thus described my invention, what I claim is:

1. The herein described belt-making process, consisting in forming a cylindrical belt member from a sheet of rubberized woven material having warp and woof threads forming suitable angles with the length of the sheet, vulcanizing said member and subsequently forming a spiral cut therein to produce a belt of the required length and width.

2. A belt-making process, consisting in forming a cylindrical belt member from a sheet of rubberized material by winding said material around a drum to give the member the required number of superposed layers, vulcanizing said members while on the drum, and producing a spiral kerf therein to form a belt of the required length and width.

3. A belt-making process, consisting in forming a cylindrical belt member of superposed layers of rubberized fabric, mounting said member on a suitable support, rotating the support and the belt member, applying a knife thereto and causing the knife to travel in a direction parallel with the axis of the support during the rotary action of the latter.

4. A belt-making process consisting in forming a cylindrical belt member from superposed layers of rubberized material, vulcanizing the said member, rotating the member and cutting a spiral kerf therethrough during the rotary movement thereof.

5. The herein described belt making process, consisting in forming a cylindrical belt member of superposed layers of rubberized fabric, whose warp and woof threads form suitable angles with the length of the sheet, vulcanizing said member and subsequently forming a spiral cut therein to produce a belt of the required length and width.

6. The herein described belt making process, consisting in forming a cylindrical belt member from a sheet of rubberized material whose warp and woof threads form suitable angles with the length of the sheet, vulcanizing said member and forming a spiral cut therein to produce a belt of the required length and width, the pitch of the spiral cut being different in degree from said angles.

7. The herein described belt making process, consisting in forming a cylindrical belt member from a sheet of rubberized material whose warp and woof threads form suitable angles with the length of the sheet, vulcanizing said member and forming a spiral cut therein to produce a belt of the required length and width, the said angles being greater in degree than the pitch of the spiral.

8. A process, consisting in forming a cylindrical belt member from a sheet of woven rubberized material arranged in superposed layers, and forming a spiral cut therein to produce a belt of the required length and width, the said cut being in nonconformity with either the warp or woof threads of the fabric.

In testimony whereof I affix my signature.

CHARLES C. GATES.